No. 869,932.   PATENTED NOV. 5, 1907.
C. S. McKEE.
PISTON.
APPLICATION FILED JUNE 7, 1907.
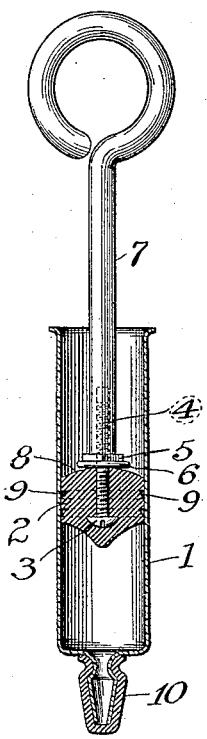
Witnesses
Ray White
Harry R. L. eulitz
Inventor
Charles S. McKee
By Kummler & Kummler
Att'ys

UNITED STATES PATENT OFFICE.

CHARLES S. McKEE, OF GLENCOE, ILLINOIS.

PISTON.

No. 869,932.  Specification of Letters Patent.  Patented Nov. 5, 1907.

Application filed June 7, 1907. Serial No. 377,806.

*To all whom it may concern:*

Be it known that I, CHARLES S. MCKEE, a subject of the King of Great Britain, and a resident of Glencoe, county of Cook, State of Illinois, have invented certain new and useful Improvements in Pistons, of which the following is a specification.

The main objects of this invention are to provide an improved and inexpensive form of piston particularly adapted for use in syringes and small pumps and capable of being readily expanded and contracted in diameter; and to provide a piston of this type which is especially adapted for use in syringes having tubular glass cylinders and adapted to be readily adjusted, without special grinding, to fit such cylinders which, as usually manufactured, are likely to vary considerably in diameter on account of the difficulty of making glass tubing of uniform bore throughout. These objects are accomplished by the device shown in the accompanying drawing which represents a longitudinal section of a syringe having a glass body and provided with a piston constructed according to this invention.

In the form shown the cylinder 1 of the syringe is of glass. As is well known, such glass tubes, though intended to be of uniform size, are likely to vary considerably in diameter due to various causes incident to the manufacture thereof. This has usually made it necessary to grind either the bore of the cylinder or the periphery of the piston to get a perfect fit in each individual case.

The piston 2 is formed of soft rubber, or of a similar resilient yielding material, molded to a diameter approximately that of the cylinder and being adjustable to exactly fit the cylinder as will be hereinafter described. The piston 2 is mounted around a screw, having a head 3 embedded in the body of the piston and having a threaded shank 4 disposed axially thereof. The head 3 is located near one end of the piston so that the greater part of the length of the piston will extend along the threaded shank.

A nut 5 and washer 6 are mounted on the threaded shank so as to bear against the adjacent end of the piston. The head 3 and washer 6 form shoulders which are relatively adjustable for compressing the interposed part of the piston and such interposed part is of sufficient length so that the adjustment of the washer 6 toward the head 3 will expand the diameter of the piston. The handle 7 forms an extension of the stem and has a threaded socket in its end into which the shank 4 is screwed.

The upper end 8 of the piston is convex toward the washer so that, although the washer is of smaller diameter than the piston, its pressure will be distributed over practically the entire transverse area of the piston and cause a more uniform expansion of diameter throughout the length of the piston than would be the case if the top of the piston were flat. The periphery of the piston is provided with a plurality of annular grooves 9 which, besides serving their usual function of preventing leakage around the edges of the piston, have the additional effect of causing the piston to expand in diameter more uniformly throughout its length than would be the case if the periphery of the piston were not so grooved. The section of these grooves is preferably of the triangular form shown. The lower end of the piston is preferably of such form as to force out the greater part of the contents of the cylinder when the piston is moved to the extreme end thereof. The nozzle of the cylinder is provided with the usual rubber cap 10 for closing it when not in use.

The pistons are molded to a diameter slightly smaller than that of the bore of the cylinders with which they are to be used. Then by adjusting the nut 5 the individual pistons may be expanded in diameter as to exactly fit their individual cylinders. This adjustment also permits of taking up the wear of the piston after continued use.

What I claim as my invention and desire to secure by Letters Patent, is:

1. The combination of a stem having a head at one end and having a threaded part near said head, a nut mounted on said threaded part, a piston of rubber molded on said head so as to inclose said head and having a part thereof interposed between said head and nut, said part being of such length in proportion to its diameter that its diameter may be adjusted through the adjustment of said nut along said stem.

2. The combination of a stem, a headed screw having threaded engagement with the end of said stem, a nut mounted on said screw, a piston of rubber molded on said head so as to inclose the head and a part of the shank of said screw, the part of said piston which is interposed between said head and nut being of sufficient length in proportion to its diameter that its diameter may be adjusted through the relative adjustment of said shoulders.

3. The combination of a stem, a headed screw having threaded engagement with the adjacent end of said stem, a piston of rubber molded around the head and a part of the shank of said screw, the part of said piston which is interposed between said head and stem being of sufficient length in proportion to its diameter that its diameter may be adjusted through the relative adjustment of said shoulders, the end of said piston which is adjacent to said stem being convex toward said stem, whereby the pressure of said stem will be distributed toward the periphery of the piston and tend to cause said piston to expand uniformly and the periphery of said piston being provided with annular grooves.

Signed at Chicago this 5th day of June 1907.

CHARLES S. McKEE.

Witnesses:
  E. A. RUMMLER,
  GERTRUDE L. YORKE.